United States Patent [19]

Every et al.

[11] Patent Number: 4,668,023
[45] Date of Patent: May 26, 1987

[54] CONTROL VALVE FOR AN ANTI-LOCK BRAKE SYSTEM

[75] Inventors: Peter Every, Livonia; Edward N. Fuller, Manchester, both of Mich.; David T. Ayers, Richmond, Va.

[73] Assignee: Kelsey-Hayes Company, Romulus, Mich.

[21] Appl. No.: 764,162

[22] Filed: Aug. 9, 1985

[51] Int. Cl.$^4$ .............................................. B60T 8/02
[52] U.S. Cl. ................................ 303/100; 188/181 R; 251/129.15; 303/6 C; 303/61; 303/68; 303/119; 303/DIG. 4
[58] Field of Search ............................ 303/113-119, 303/61-63, 68-69, 6 C, 84 A, 84 R, 91, 92, 100, DIG. 1, DIG. 2, DIG. 3, DIG. 4, 10-12, 106; 188/181, 349, 151 A; 310/51; 251/129.14-129.22, 129.11, -129.13; 335/257, 258, 277

[56] References Cited

U.S. PATENT DOCUMENTS

| | | | |
|---|---|---|---|
| 3,515,440 | 6/1970 | Every et al. | 303/115 |
| 3,550,966 | 12/1970 | Leiber | 303/119 |
| 3,617,098 | 11/1971 | Leiber | 303/119 |
| 3,731,979 | 5/1973 | Mikaila | 303/DIG. 4 |
| 3,761,140 | 9/1973 | Lewis et al. | 303/114 |
| 3,870,376 | 3/1975 | Riordan | 303/92 |
| 3,880,474 | 4/1975 | Scharlack | 303/106 X |
| 3,975,060 | 8/1976 | Hirayama | 188/349 X |
| 3,981,543 | 9/1976 | Atkins | 303/115 X |
| 4,073,542 | 2/1978 | Yabuta et al. | 188/349 X |
| 4,085,978 | 4/1978 | Nogami | 188/349 X |
| 4,091,348 | 5/1978 | Kawamoto et al. | 335/277 X |
| 4,418,966 | 12/1983 | Hattwig | 303/100 |
| 4,435,021 | 3/1984 | Hoenick | 303/119 X |
| 4,466,671 | 8/1984 | Miyasaka | 303/6 C |
| 4,515,343 | 5/1985 | Pischinger et al. | 251/129.15 X |
| 4,522,372 | 6/1985 | Yano et al. | 251/129.15 |
| 4,523,792 | 6/1985 | Belart et al. | 303/100 X |
| 4,531,708 | 7/1985 | Livet | 251/129.15 X |
| 4,532,951 | 8/1985 | Fermanich | 251/129.15 X |
| 4,561,701 | 12/1985 | Fujii et al. | 303/119 |

FOREIGN PATENT DOCUMENTS 2106605 4/1983 United Kingdom ................ 303/119

Primary Examiner—Douglas C. Butler
Attorney, Agent, or Firm—Ralph J. Skinkiss; Mark J. Sobanski

[57] ABSTRACT

The present invention concerns a control valve for use in a vehicle anit-lock braking systm adapted to control the application of pressurized brake fluid to at least one selected vehicle brake. The valve includes an outer housing having an inlet coupled to receive pressurized brake fluid from the vehicle master cylinder and an outlet coupled to supply pressurized brake fluid to the selected vehicle brakes. A passageway is formed in the housing for connecting the inlet to the outlet. A normally open isolation valve is located in the passageway and is utilized to control the flow of fluid through the passageway between the inlet and the outlet. When an incipient wheel lock condition is detected, the isolation valve can be closed to prevent a further increase in pressure to the controlled brakes and to hold the pressure supplied to the controlled brakes at a relatively constant level. After the isolation valve has been closed and it is desired to further increase the pressure to the controlled brakes, the valve can be momentarily opened to enable increased pressure from the vehicle master cylinder to be supplied to the controlled brakes. In accordance with the present invention, a damping mechanism is associated with the isolation valve for damping the movement of the valve as the valve is moved from the closed position. It has been found that such damping enables the reapplication of pressure to the selected brakes to be more precisely controlled.

21 Claims, 10 Drawing Figures

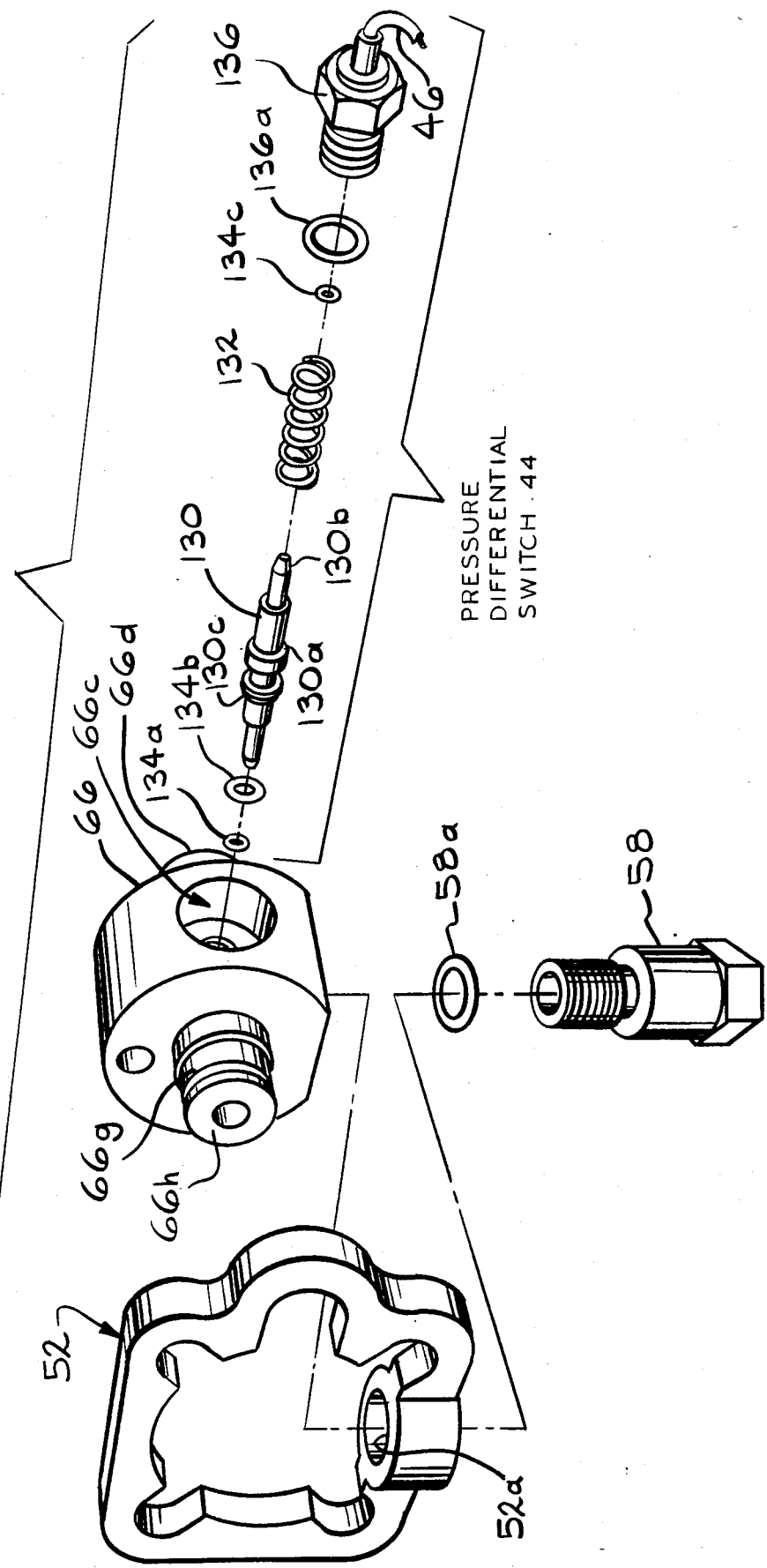

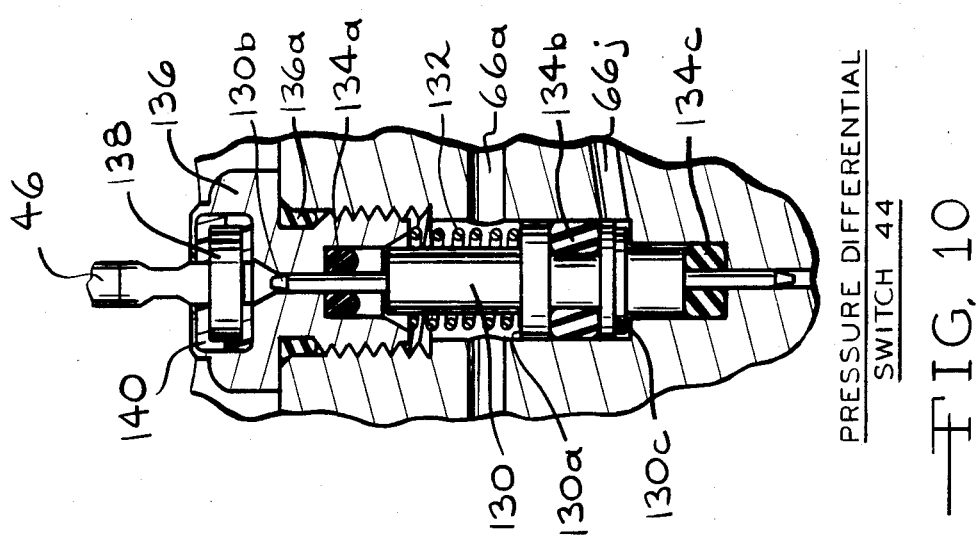
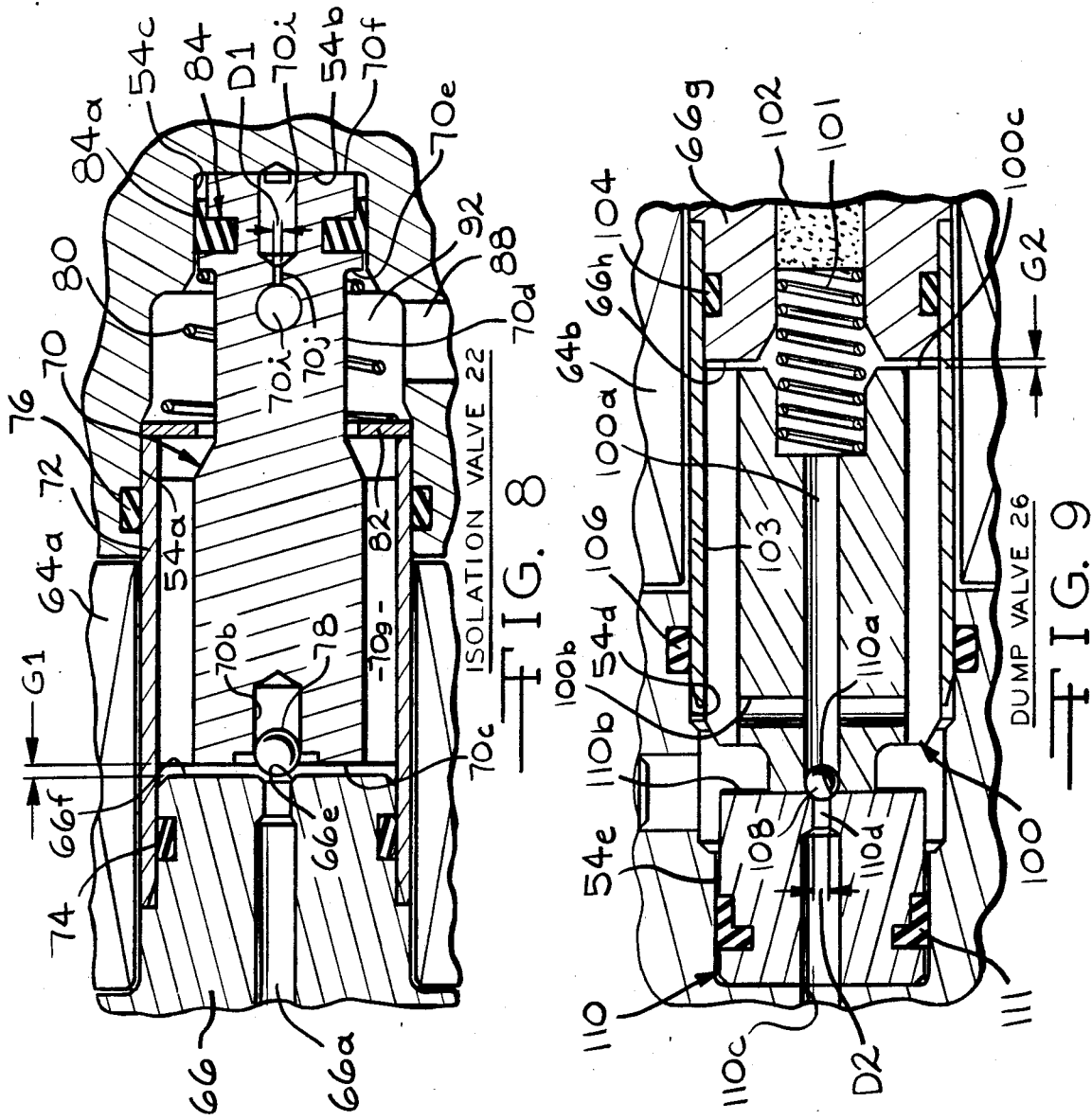

CONTROL VALVE FOR AN ANTI-LOCK BRAKE SYSTEM

CROSS-REFERENCE TO A RELATED APPLICATION

The present application is related in subject matter to copending application Ser. No. 702,765 filed Feb. 19, 1985 entitled VEHICLE SKID CONTROL SYSTEM and assigned to the assignee of the present invention, and is herein incorporated by reference.

BACKGROUND OF THE INVENTION

The present invention relates generally to a control valve for use in a vehicle skid control system and, in particular, to a control valve for use in a vehicle skid control system wherein the braking of a predetermined number of wheels of a multi-wheeled vehicle is controlled and at least one braked wheel of the vehicle is not controlled by the skid control system.

Braking a vehicle in a controlled manner under adverse conditions such as rain, snow, or ice generally requires precise application of the brakes by the vehicle driver. Under these conditions, or in panic stop situations, a driver will often apply excessive brake pressure, thus causing the wheels to lock such that excessive slippage between the wheels and the road surface takes place. Wheel lockup conditions can lead to loss of directional stability and, possibly, uncontrolled vehicle spinout.

In a continuing effort to improve the operational safety of vehicles, many companies have been involved in the development of skid control braking systems. While typically such systems are adapted to control the braking of each braked wheel of a vehicle, some systems have been developed for controlling the braking of only a portion of the braked wheels. Examples of prior art skid control systems are disclosed in U.S. Pat. Nos. 3,515,440; 3,870,376; and 3,880,474.

Generally, prior art skid control systems include a central control unit for monitoring the speed of the controlled wheels to determine the deceleration of the controlled wheels. When the brakes of the vehicle are applied and the wheel deceleration of the monitored wheels exceeds a predetermined deceleration threshold, indicating that there is wheel slippage and the wheels are approaching a lockup condition, the central control unit functions to control the application of hydraulic pressure through a suitable valve means to the associated brakes to prevent lockup of the controlled wheels. Typically, the skid control system includes means for cyclically relieving and reapplying pressure to the associated brakes to limit wheel slippage to a safe level while continuing to produce adequate brake torque to decelerate the vehicle as desired by the driver. In these systems, the means for reapplying pressure is generally a separate hydraulic power source.

Despite the tremendous advantages a skid control system can provide in stopping a vehicle in a controlled manner under adverse braking conditions, very few vehicles are actually provided with such control systems. One of the chief reasons for this is that the control units and associated valving of such systems are somewhat sophisticated and expensive, and are therefore typically only found on more expensive vehicles.

SUMMARY OF THE INVENTION

The present invention concerns a unique control valve for use with a vehicle anti-lock braking system. Basically, the anti-lock braking system is adapted to control, via the control valve, the application of brake fluid pressure to at least one selected braked wheel of an associated vehicle. When an incipent wheel lock condition of the controlled wheels is detected, further application of fluid pressure to the controlled wheel brake is cut off by the control valve and the fluid pressure to the controlled wheel brakes at that time is held at a relatively constant level, and is maintained at that level during the completion of the wheel stop unless certain conditions are present. For example, if after the brake pressure is held, the controlled wheel deceleration exceeds the predetermined amount, the control valve is operated to selectively reduce the brake pressure to the controlled wheel to reduce excessive wheel slippage.

Also, after a wheel slip condition has been corrected, the system is designed to detect when the vehicle travels from a relatively low friction surface (i.e. ice) to a relatively high friction surface (i.e. concrete). In these instances, the brake wheels not controlled by this skid control system will cause the vehicle to decelerate at a greater rate. Under these conditions, the brake pressure applied to the controlled wheels can generally be increased without causing a lock up condition. The braking system detects such an increase in deceleration and operates the control valve to selectively cause additional pressure to be supplied to the controlled wheel brakes.

The control valve of the present invention is specifically designed for use in a skid control system for a vehicle having first and second sets of wheel brakes. A brake pedal is operable by the vehicle operator and is connected to actuate a master cylinder for supplying pressurized brake fluid. The pressurized brake fluid is supplied to a first brake pressurizing circuit to actuate the first set of wheel brakes, and is also supplied to a second brake pressuring circuit to actuate the second set of wheel brakes. The control valve of the present invention is connected in the second brake pressurizing circuit, and is operable by a computer control means.

More specifically, the control valve includes an outer housing having an inlet coupled to receive pressurized brake fluid from the master cylinder and an outlet coupled to supply pressurized brake fluid to the second set of wheel brakes. A passageway connecting the inlet to the outlet is formed in the housing. A normally open isolation valve is located in the passageway and is utilized to control the flow of fluid through the passageway between the inlet and the outlet. The control valve includes means for closing the isolation valve to hold the fluid pressure to the second set of wheel brakes at a relatively constant level. Further, the valve includes means for momentarily opening the isolation valve after the valve has been closed to selectively reapply pressure from the master cylinder to the second set of wheel brakes. In accordance with the present invention, damping means are associated with the isolation valve for damping the movement of the isolation valve as the valve is moved from the closed position to the open position. This enables the reapplication of pressure to the second set of wheel brakes to be precisely controlled.

The damping of the isolation valve is achieved in a unique manner. In particular, the isolation valve cooperates with the housing to define a chamber for containing brake fluid, which chamber varies in volume as the isolation valve is moved from the closed to the open position. In the preferred embodiment of the invention, the damping means includes means for permitting a predetermined fluid flow between the housing passageway and the chamber when the valve is moved from the open position to the closed position, and means for partially restricting fluid flow between the housing passageway and the chamber when the valve is moved from the closed position to the open position, thereby achieving the desired damping of the isolation valve during the opening thereof.

BRIEF DESCRIPTION OF THE DRAWINGS

The above, as well as other advantages of the present invention, will become readily apparent to one skilled in the art when the following detailed description of the invention is read in conjunction with the attached drawings, in which:

FIG. 7 is an exploded perspective view illustrating the individual components of the pressure differential switch;

FIG. 8 is an enlarged sectional view of the isolation valve as illustrated in FIG. 4;

FIG. 9 is an enlarged sectional view of the dump valve as illustrated in FIG. 4; and FIG. 10 is an enlarged sectional view of the pressure differential switch as illustrated in FIG. 5.

DESCRIPTION OF THE PREFERRED EMBODIMENT

Figure 1:
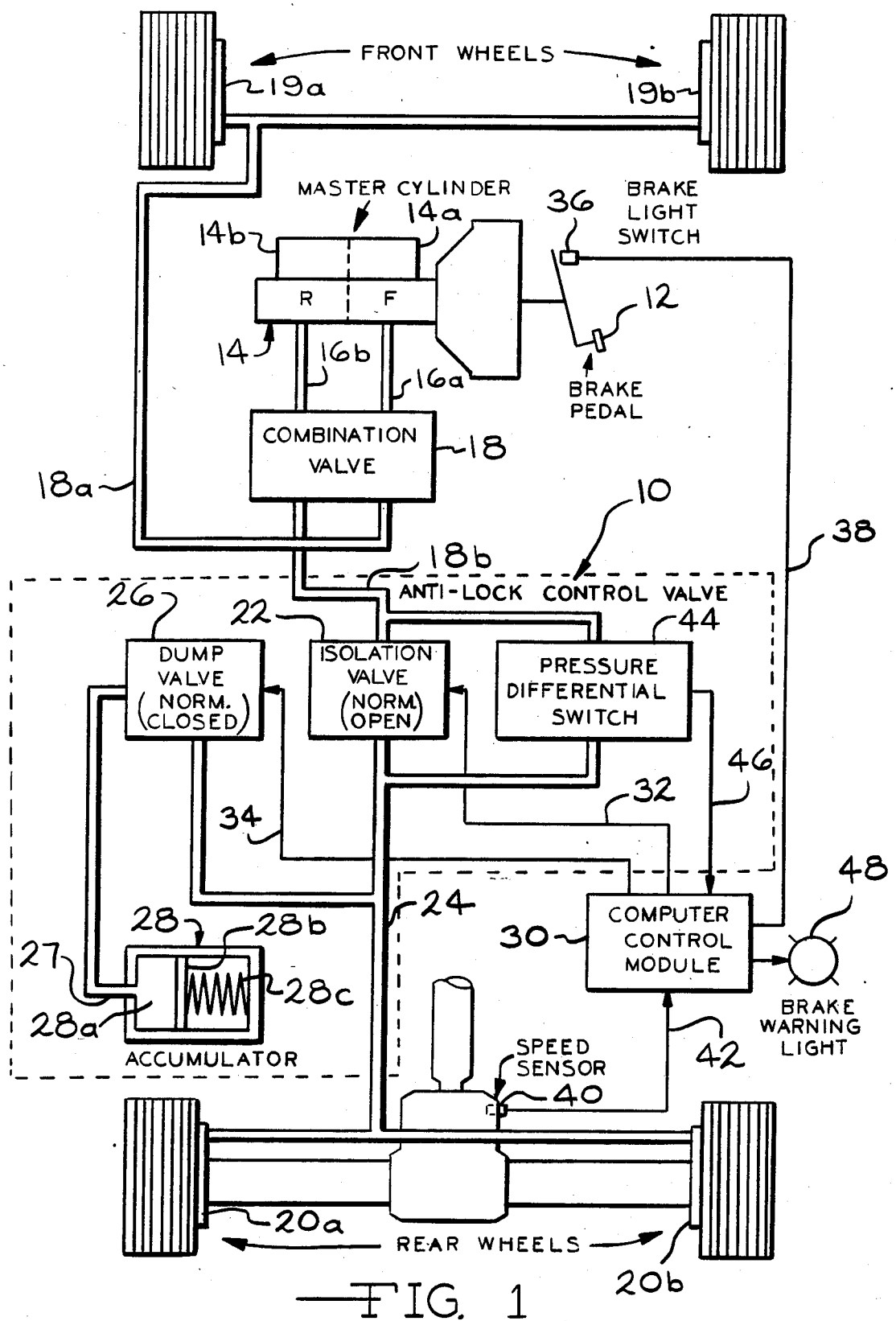
FIG. 1 is a schematic diagram illustrating the skid control system which utilizes the control valve of the present invention.

Referring to the drawings, and particularly to FIG. 1, there is shown a schematic diagram of an anti-skid control system which utilizes a control valve 10 embodying the features of the present invention. The anti-skid control system is specifically adapted to monitor and control the braking of a predetermined number of wheels of a multi-wheeled vehicle having at least one braked wheel which is not connected to the anti-skid control system. For example, as illustrated in FIG. 1, the anti-skid control system can be utilized to control the braking of the rear wheels of a four wheeled vehicle wherein the front brakes of the vehicle are not controlled by the anti-skid control system. Such a system is especially desirable for a vehicle such as a small truck, for example, wherein the weight supported by the rear wheels can vary greatly due to the wide range of payloads the truck may be transporting.

As shown in FIG. 1, the anti-skid control system is installed on a vehicle having a hydraulic braking system consisting of a brake pedal 12 coupled to operate a dual reservoir master cylinder 14. When the vehicle operator depresses the brake pedal 12, the master cylinder 14 supplies hydraulic fluid under pressure from a front reservoir 14a through a hydraulic line 16a and from a rear reservoir 14b through a hydraulic line 16b to a conventional combination valve 18. The combination valve 18 includes a first output line 18a adapted to supply hydraulic fluid at a first predetermined pressure to actuate the vehicle front brakes 19a and 19b and a second output line 18b which supplies fluid at a second predetermined pressure to actuate the vehicle rear brakes 20a and 20b. While not shown in the drawings, the combination valve 18 is typically provided with an integral pressure differential switch for detecting a predetermined pressure difference between the fluid in the lines 16a and 16b, which difference is indicative of a partial brake failure.

In accordance with the present invention, the anti-lock control valve 10 is provided with a normally open isolation valve 22 connected between the line 18b and a line 24 which supplies the pressurized brake fluid to the rear brakes 20a and 20b. As will be discussed, the isolation valve 22 is solenoid operated and is closed in the event impending rear wheel lockup is detected to hold the pressure in the line 24 and thus prevent any further increase in pressure in the line 18b from being supplied to the line 24.

Also, in accordance with the present invention, the anti-lock control valve 10 includes a normally closed dump valve 26 connected between the line 24 and a line 27 which is connected to an accumulator 28. The accumulator 28 includes a variable volume fluid reservoir 28a for containing hydraulic fluid which is maintained at a slightly elevated pressure by a slidable piston 28b biased by a spring 28c. More specifically, the spring 28c maintains the fluid in the accumulator at a pressure slightly above the non-actuated pressure of the fluid in the line 24. As will be discussed, when the isolation valve 22 has been closed and the pressure held in the line 24 continues to cause excessive slippage of the rear wheels, the dump valve 26 is selectively opened to direct fluid into the accumulator 28 to reduce the pressure in the line 24 and prevent lockup of the rear brakes. After the brake pedal 12 has been released, the dump valve 26 can be momentarily opened to return fluid in the accumulator 28 to the line 24.

The operation of the isolation valve 22 and the dump valve 26 is controlled by a computer control module 30. The isolation valve 22 and the dump valve 26 are solenoid operated valves which can be connected to the computer control module by means of electric lines 32 and 34 respectively. In order to determine whether the vehicle operator is in the process of braking the vehicle, the computer control 30 is connected to a brake light switch 36 by a line 38 to monitor whether of the brake pedal 12 is depressed. The computer control module 30 is also connected to a speed sensor 40 by a line 42 to monitor the speed of the vehicle rear wheels.

In addition to monitoring the position of the brake pedal 12 via the brake light switch 36 and the rear wheel speed via the speed sensor 40, the computer control module 30 is connected to a pressure difference switch 44 by a line 46. The pressure differential switch 44 is coupled to monitor the pressure difference between the fluid in the lines 18b and 24 and is adapted to close when the pressure in the line 18b is greater than the pressure in the line 24. When the pressure differential switch is in the on state, this indicates that the isolation valve has closed and that the pressure in the line 18b is greater than the pressure in the line 24 and, when the switch is in the off state, this indicates that the pressure in the line 18b is equal to or has dropped below the pressure in the line 24.

In instances wherein the switch 44 has turned on, and has subsequently turned off, this indicates a situation wherein the operator has initially applied a relatively heavy braking effort to the brake pedal to cause the isolation valve to close to prevent lockup of the rear wheels and, subsequently, has reduced braking effort to the pedal without necessarily completely releasing the pedal. It is in this situation where it is desirable to release the anti-lock mode and return the braking system to the normal operating mode. Thus, if the system senses that the pressure differential switch 44 has at one point turned on, but is now off, the system will return to the normal braking mode and the beginning of the loop. Typically, there is some hysteresis associated with the operation of the pressure differential switch 44 such that the switch 44 does not chatter between an on and off condition when the pressure in the line 18b remains relatively equal to the pressure in the line 24. Also, the control module 30 is connected to a brake warning light 48 which is activated in the event a failure in the anti-lock brake system is detected.

Basically, the anti-lock brake system monitors the rear wheel speed and deceleration and, during a vehicle stop, functions to control the application of hydraulic pressure to the vehicle rear brakes via the control valve 10 in order to prevent a lockup condition of the brakes. In the event a wheel slip condition is detected, indicating the rear brakes are approaching a lockup condition, the control module 30 closes the isolation valve 22 to hold the pressure in the line 24 at its present value. If, after the isolation valve 22 has been closed, the rear wheel deceleration rate exceeds a predetermined amount, the dump valve 26 can be selectively opened to reduce the pressure in the line 24 to prevent a lockup condition of the brakes.

Also, after an impending lockup condition has been corrected, the rate of change of deceleration of the rear wheels is monitored to detect instances wherein the vehicle travels from a road surface such as ice wherein the coefficient of friction (mu) between the vehicle and the road surface is relatively low (low mu surface) to a road surface such as concrete wherein the coefficient of friction between the vehicle and the road surface is relatively high (high mu surface). In these instances, when the vehicle front wheels contact the higher mu surface, the uncontrolled front brakes will cause an increase in the rate of deceleration of the vehicle as the vehicle travels from the low mu surface to the high mu surface. Under these conditions, the pressure held in the line 24 to the rear brakes can generally be increased to provide further braking without causing a lockup condition of the rear brakes. This is accomplished by momentarily opening the isolation valve 22 to permit the higher pressure fluid in the line 18b to be supplied to the line 24. Due to the continued braking effort by the driver on the vehicle brake pedal under a hard braking condition, the pressure in the line 18b will generally be higher than the pressure in the line 24. As will be discussed, the isolation valve 22 is provided with damping means which enables the momentary opening of the valve to be precisely controlled to regulate the pressure increase to the rear brakes.

Figure 2:
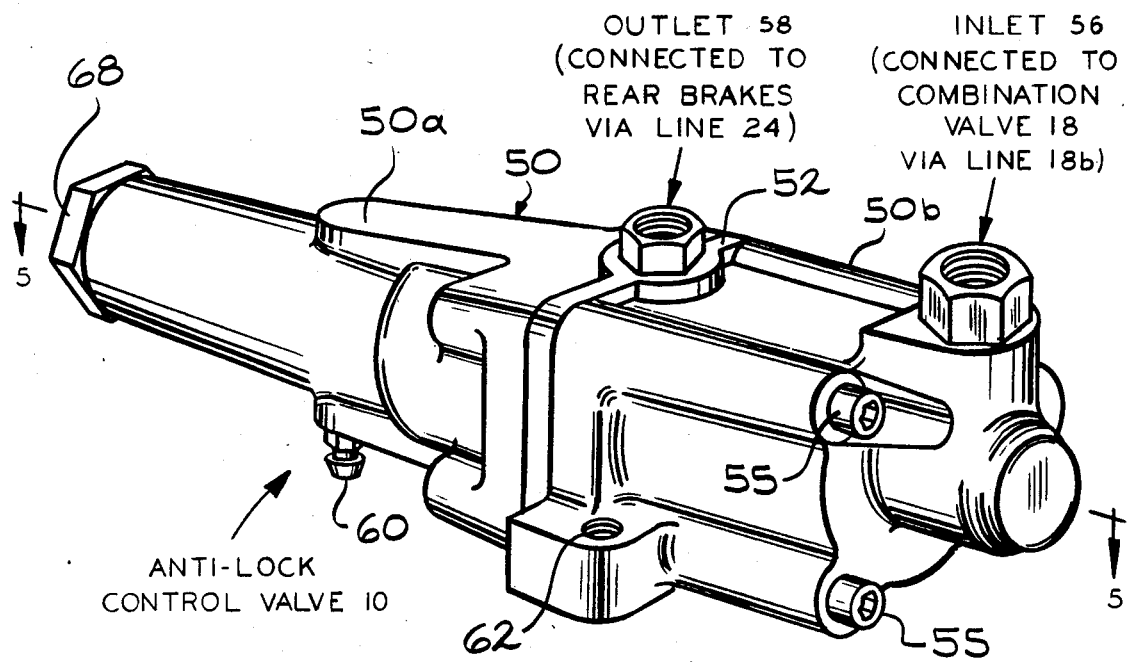
FIGS. 2 and 3 are perspective views of the preferred embodiment of the control valve of the present invention.
Figure 3:
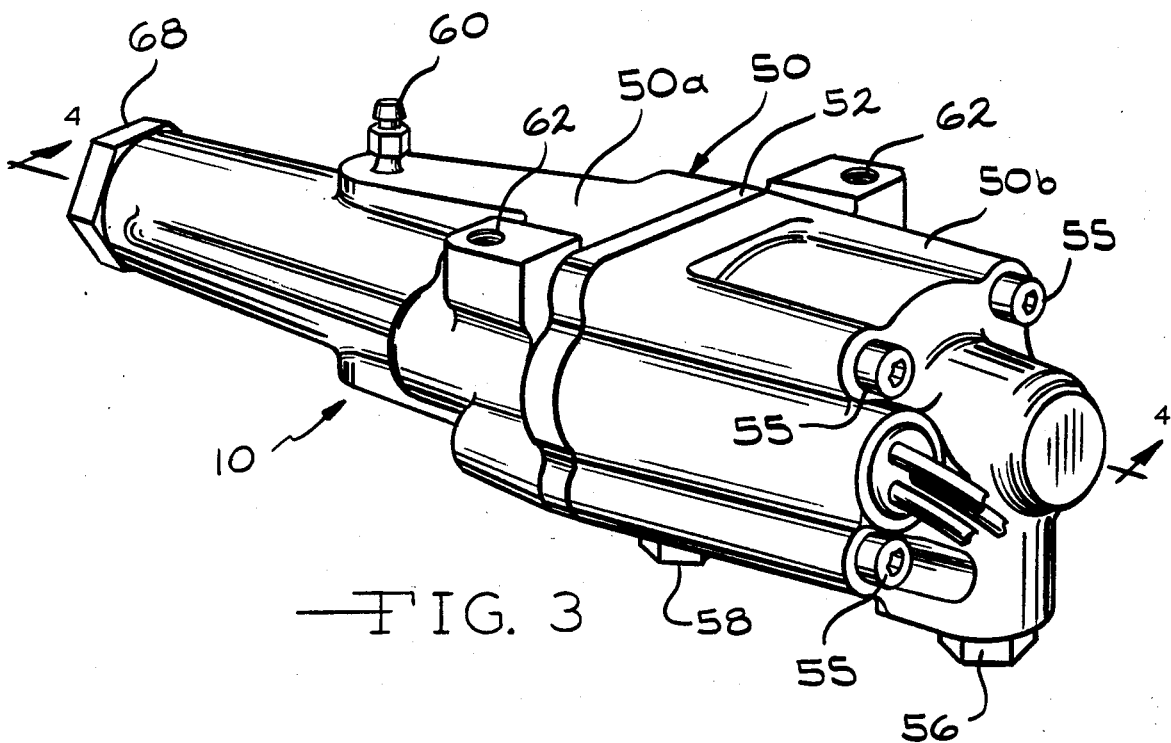
Figure 4:
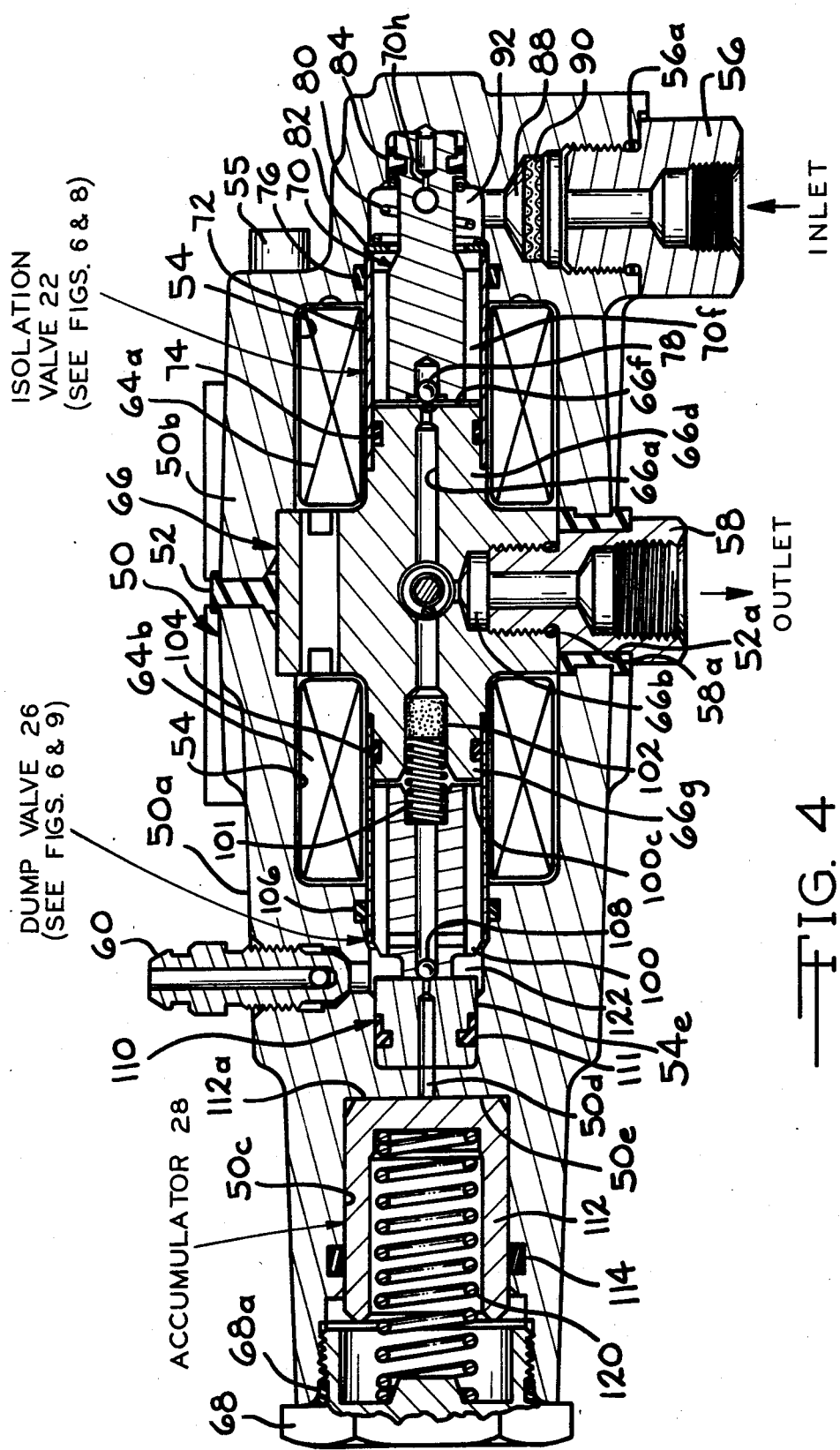
FIG. 4 is a sectional view, taken along the line 4—4 of FIG. 3 and illustrating the positions of the isolation valve, the dump valve, and the accumulator within the control valve.

The specific construction of the control valve 10 will now be discussed in more detail. Referring to FIGS. 2 and 3, there are shown perspective views of a preferred embodiment of the anti-lock control valve 10. The control valve 10 includes an outer two-piece housing 50 which, as viewed in the drawings, consists of a left end housing portion 50a and a right end housing portion 50b. An intermediate gasket member 52 (a perspective view of which is shown in FIG. 7) is positioned between the facing end surfaces of the housing portions 50a and 50b and, as shown in FIG. 4, functions to seal a longitudinally extending inner cavity 54 formed in the housing 50. The housing end portions 50a and 50b are fastened together by means of a plurality of elongated bolts 55 extending through apertures formed in the right end housing portion 50b and threaded into cooperating internally threaded apertures formed in the left end housing portion 50a.

The valve 10 includes an inlet fitting 56 which, as shown in FIG. 4, is threaded into the side wall of the right end housing portion 50b and is sealingly connected thereto by means of an O-ring 56a. The inlet fitting 56 is adapted to be connected to the line 18b to receive pressurized brake fluid from the combination valve 18. An outlet fitting 58 extends through an opening 52a (see FIG. 7) formed in the gasket member 52 and is adapted to be connected to the line 24 to supply pressurized fluid to the rear brakes. A conventional bleed screw 60 is threaded into the side wall of the left end housing portion 50a and is utilized during installation or service of the brake system to bleed the associated fluid passageways contained within the valve 10. Further, a plurality of internally threaded mounting holes 62 can be provided in the housing portions 50a and 50b for attaching the valve to the vehicle body (not shown).

As previously mentioned, the control valve 10 includes the isolation valve 22, the dump valve 26, the accumulator 28, and the pressure differential switch 44, all of which are shown in individual boxes in FIG. 1. As shown in FIG. 4, the components of the isolation valve 22 and the dump valve 26 are housed within the longitudinally extending cavity 54 defined by the cooperation of the left end housing portion 50a, the gasket member 52, and the right end housing portion 50b. The isolation valve components and the dump valve components are separated within the housing cavity 54 by an intermediate core member 66.

As will be discussed, the core member 66 is provided with a number of internal passageways for directing fluid flow through the valve. For example, as shown in FIG. 4, pressurized brake fluid having entered the valve 10 through the inlet 56 and having passed the normally open isolation valve 22 enters a longitudinally extending passageway 66a formed through the core member 66 and is supplied to the outlet fitting 58 through an outlet passageway 66b extending transversely to the passageway 66a. The outlet fitting 58 is threaded into the passageway 66b and is sealingly connected thereto by an O-ring 58a. As shown in FIG. 4, a pair of solenoid coils 64a and 64b are positioned within the housing cavity 54 and are maintained in axially spaced apart relationship by means of the core member 66.

Figure 5:
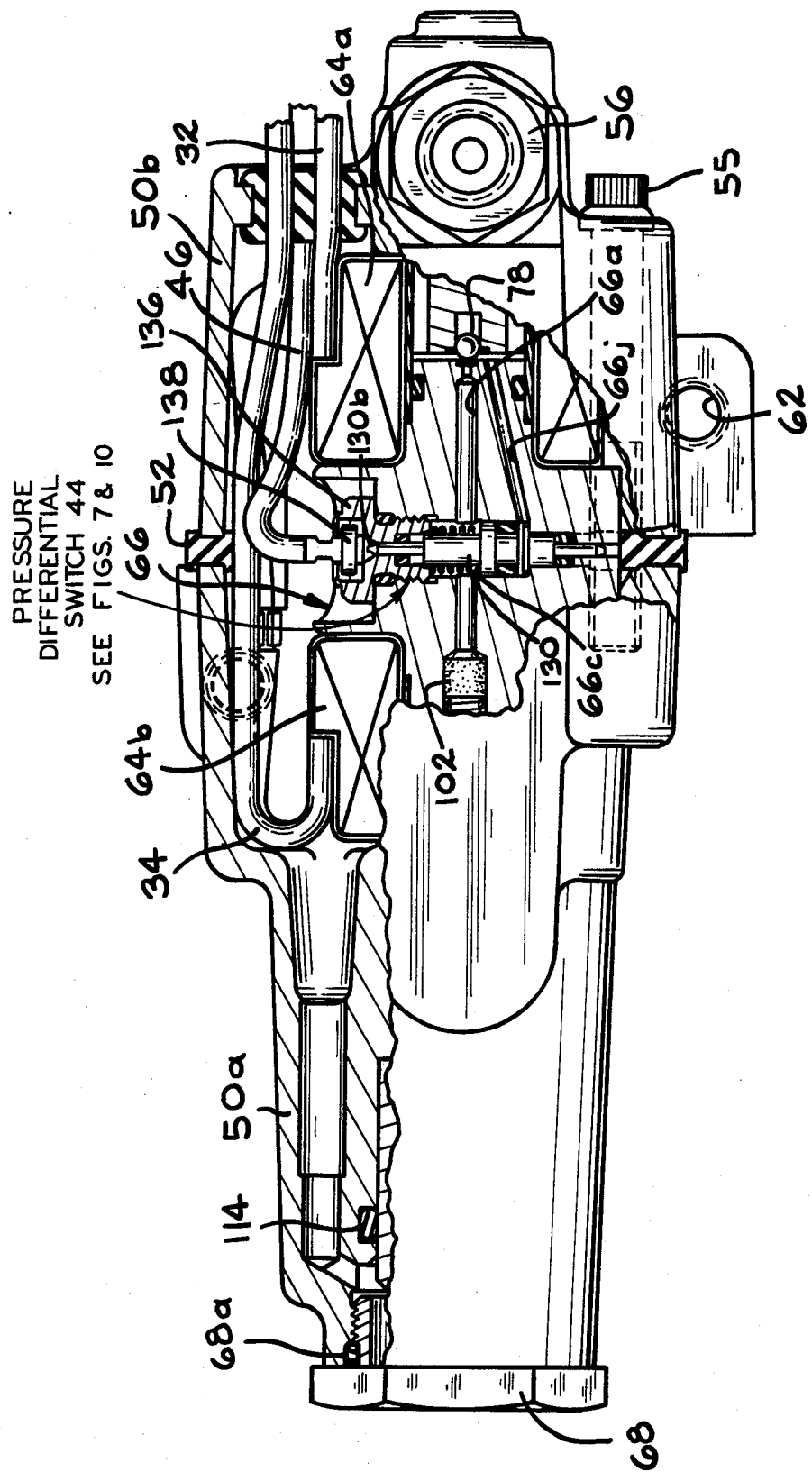
FIG. 5 is a sectional view taken along the line 5—5 of FIG. 2 and illustrating the position of the pressure differential switch within the control valve.

The solenoid coil 64a is adapted to actuate the isolation valve 22, while the solenoid coil 64b is operable to actuate the dump valve 26. The components of the accumulator 28 are located within a cavity 50c formed in the outer end of the housing portion 50a. The outer open end of the 50c cavity is sealingly closed by means of an externally threaded plug 68 and a cooperating O-ring 68a. As shown in FIG. 5, the components of the pressure differential switch 44 are positioned within an aperture 66c in the core member 66 which intersects and extends transversely relative to the longitudinal passageway 66a.

Figure 6:
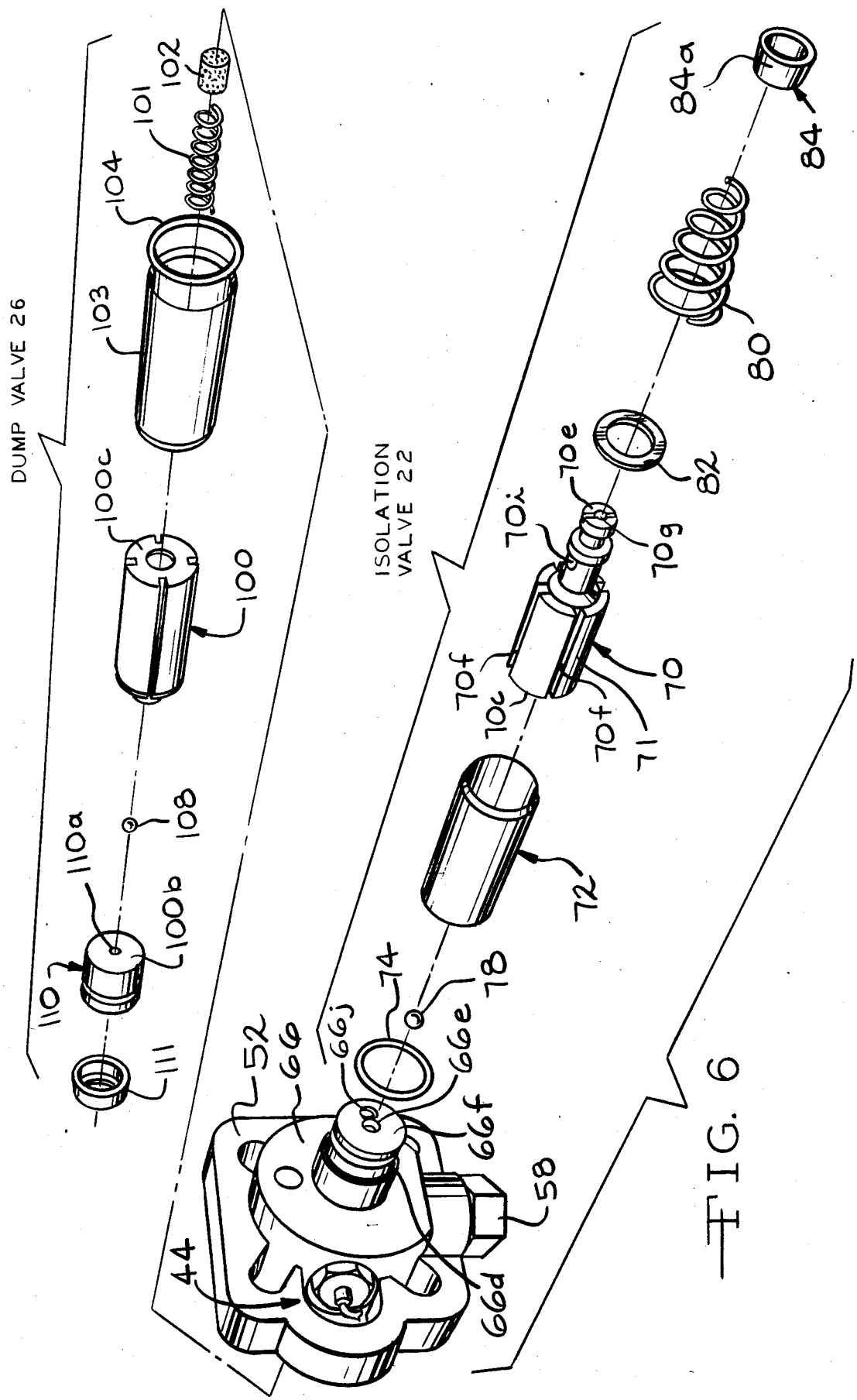
FIG. 6 is an exploded perspective view illustrating the individual components of the isolation valve and dump valve.

Referring now to FIGS. 4, 6, and 8, the individual components which comprise the isolation valve 22 and the operation thereof will be discussed in more detail. The components of the isolation valve 22 are individually shown in the exploded perspective view of FIG. 6. More specifically, the isolation valve 22 includes an axially shiftable armature 70 constructed of a suitable ferromagnetic material and having a cylindrical end 71 which is slidably received within a sleeve 72. One end of the sleeve 72 is slipped over an axially extending, reduced diameter portion 66d of the core member 66, while the opposite end of the sleeve 72 is inserted into a reduced diameter bore hole 54a (best shown in FIG. 8) formed in the right end housing portion 50b. The inner wall of the sleeve 72 is sealingly connected to the outer annular surface of the reduced diameter portion 66d of the core member 66 by an O-ring 74, while the outer wall of the sleeve member 72 is sealingly connected to the inner wall of the bore hole 54a by an O-ring 76.

As shown in FIG. 8, a sealing ball 78 is pressed into and frictionally held within a cavity 70a formed in an end face 70b of the isolation valve armature 70. The sealing ball 78 is adapted to project axially outwardly past the end face 70b. When the solenoid coil 64a is energized, the magnetic field generated thereby urges the armature 70 toward the core member 66 and the ball 78 will sealingly engage a ball seat 66e formed in an end face 66f of the core member 66 to prevent fluid flow into the passageway 66a.

The isolation valve armature 70 is maintained in a normally open position by means of a tapered helical spring 80 which, as shown in FIG. 8, is coaxially positioned about an intermediate reduced diameter portion 70c of the armature 70. One end of the spring 80 seats against one face of a washer 82 having an opposite face abutting the outer end of the sleeve 72, while the opposite end of the spring seats against a shoulder 70d provided on the outer end of the isolation valve armature 70. When the isolation valve is not energized, the spring 80 urges the outer end face 70e of the armature against the end wall 54b of the housing cavity 54, as shown in FIGS. 4 and 8. As will be discussed, in accordance with the present invention, the outer end of the isolation valve armature 70 is provided with a damping ring 84 which surrounds the outer end of the armature and is utilized to dampen the movement of the armature when the valve is moved from its closed to its open position.

As previously mentioned, the isolation valve 22 is normally maintained in the open position such that brake fluid pressure supplied to the rear brakes via the outlet 58 is the same pressure as the pressure present at the inlet 56. More specifically, the brake fluid flows from the inlet 56 into a passageway 88 formed in the side wall of the housing portion 50b. A filter screen 90 can be positioned in the passageway 88 to provide filtering for fluid entering the valve. From the passageway 88, fluid flows into a chamber 92 surrounding the reduced diameter portion 70c of the armature 70. The fluid then flows axially through longitudinally extending slots 70f formed in the armature 70 and into a gap between the end face 66f of the core member 66 and the inner end face 70b of the armature 70. As shown in FIG. 8, this gap is set to a predetermined distance G1 such that, after the isolation valve has been closed, and it is desired to reapply pressure to the rear brakes by momentarily opening the isolation valve, the amount of pressure increase to the rear brakes can be precisely controlled. After having entered the gap G1, fluid can flow past the ball 78 and into the longitudinally extending passageway 66a where fluid is supplied to the outlet fitting 58 via the outlet port 66b (shown in FIG. 4).

When the solenoid coil 64a is energized, the magnetic force generated thereby urges the armature 70 axially against the force of the spring 80 and causes the ball 78 to sealingly engage the associated ball seat 66e, thereby blocking fluid flow from the inlet 56 to the outlet 58 to maintain the pressure to the rear brakes at a constant level. As previously mentioned, in some instances, it is desirable to selectively open the isolation valve to provide a predetermined amount of pressure increase to the rear brakes. In order to accurately control the pressure increase to the rear brakes, it has been discovered that the selective opening of the isolation valve must be precisely controlled. To achieve such control, the present invention includes damping means associated with the isolation valve for controlling the opening of the isolation valve, thereby regulating the pressure increase to the rear brakes.

More specifically, this damping is provided by the damping ring 84 positioned within an annular groove formed in the outer end of the isolation valve armature. The damping ring 84 is specifically designed to prevent fluid flow between an outer annular surface 84a of the ring 84 and an inner annular surface of the cavity 54 when the valve is moved from the open to the closed position, but will allow fluid flow between the annular surfaces 84a and 54c when the valve is moved from its open to its closed position.

When the valve is moved from its open to its closed position, fluid will flow between the ring surface 84a and the inner annular cavity surface 54c to fill the resulting chamber between the end face 70e of the armature and the inner end wall 54b of the cavity. Additionally, fluid will flow into this chamber by way of a transversely extending bore hole 70i formed in the armature 70 which communicates with an axially extending passageway 70g having a reduced diameter portion 70h. However, when the valve is moved from its closed to its open position, since the damping ring 84 is designed to prevent fluid flow across its exterior surface 84a as the armature 70 is moved toward the right from its closed to its open position, fluid located in the chamber between the end face 70e of the armature 70 and the end wall 54b of the cavity must flow through the reduced diameter portion 70h of the passageway 70g before the valve can be moved toward the right. In accordance with the present invention, the diameter D1 of the portion 70h is selected to partially restrict the fluid flow from the chamber, thus damping the opening movement of the armature 70. It has been found that such damping enables the reapplication of pressure to the rear brakes to be more precisely controlled.

Referring to FIGS. 4, 6, and 9, the specific construction and operation of the dump valve 26 will now be discussed in more detail. As previously mentioned, the dump valve is normally maintained in a closed state, but can be selectively opened after the isolation valve has been closed to dump fluid into an accumulator 28 to selectively reduce the pressure to the rear brakes. The components of the dump valve 26 are individually shown in the exploded perspective view of FIG. 6. The dump valve 26 includes an armature 100 constructed of a ferromagnetic material which is axially shiftable upon actuation of the solenoid coil 64b. As shown in FIGS. 4 and 9, the armature 100 is biased in a normally closed position by means of a compressed helical spring 101 having one end received within an opening in the inner end of the armature 100 and an opposite end which engages a filter 102 positioned in the core passageway 66a. The armature 100 is slidably mounted within a sleeve member 103 having one end which is slipped over a reduced diameter end portion 66g of the core member 66 and is sealingly connected thereto by means of an O-ring 104, and has an opposite end which is inserted into a reduced diameter portion 54d of the cavity 54 and is sealingly connected thereto by means of an O-ring 106.

The dump valve armature 100 is provided with a central, axially extending passageway 100a. A sealing ball 108 is pressed into and frictionally held within the outer end of the passageway 100a, and is adapted to sealingly engage a ball seat 110a formed in an end face 110b of a floating piston 110. The spring 101 compressed between the dump valve armature 100 and a filter element 102 maintains the dump valve armature in a normally closed position. The piston 110 includes a central, axially extending passageway 110c having a reduced diameter portion 110d adjacent the ball seat 110a. The passageway 110c is in axial alignment with a passageway 50d formed in the end wall of the cavity 54 which, when the dump valve is open, supplies brake fluid into the accumulator 28. An annular sealing ring 111 surrounds the piston 110 and sealing engages an annular wall 54e of the cavity 54.

The accumulator 28 includes a piston 112 (which corresponds to the piston 28b of FIG. 1) slidably mounted within the cavity 50c formed in the one end of the housing portion 50a and closed by the plug 68. An O-ring 114 is positioned within an annular groove formed in the cavity 50c to sealingly engage the outer cylindrical wall of the piston 112. Normally, the piston 112 is urged axially inwardly by means of a helical spring 120 (which corresponds to the spring 28c schematically shown in FIG. 1) such that the end surface 112a of the piston 112 abuts an inner end wall 50e of the cavity 50c. When the dump valve is momentarily opened to selectively reduce pressure to the rear brakes, brake fluid will be supplied into the cavity 50c to urge the piston 112 axially toward the left and compress the spring 120. In accordance with the present invention, the annular sealing ring 111 surrounding the floating piston 110 is adapted to prevent fluid flow between the exterior walls of the piston 110 and into the accumulator but, when the pressure in the rear brake circuit falls below the pressure in the accumulator, fluid can be returned to the rear brake circuit by flowing past the annular sealing ring 111, and into a chamber 122 surrounding the outer end of the armature 100.

As previously mentioned, the dump valve is normally closed such that fluid having passed through the filter 102, into the longitudinal armature passage 100a, and then through transversely extending armature passageways 100b enters a chamber 122 surrounding the outer end of the armature 100, but will not enter the accumulator 28 due to the sealing of the ball 108 and the ring 111. When it is desired to reduce the fluid pressure supplied to the rear brakes, the solenoid coil 64b is momentarily actuated to shift the armature 100 and disengage the ball 108 from the ball seat 110a. This enables fluid to enter the accumulator via the passageway 110c. After completion of a controlled stop and a release of the brake pressure to the rear wheels, fluid contained in the accumulator will automatically be returned to the system in a manner as described above. It should be noted that, by properly selecting the diameter D2 of the passageway 110d and the dimension G2 of the gap between an end face 100c of the armature 100 and an end face 66h of the core member 66, the amount of pressure reduction can be precisely controlled.

Referring to FIGS. 5, 7, and 10, the specific construction and operation of the pressure differential switch 44 will now be discussed. As previously mentioned, the pressure differential switch 44 monitors the difference in pressure between the pressure received from the combination valve 18 of FIG. 1 and the pressure supplied to the rear brakes. Normally, if the pressure supplied to the rear brakes is less than or equal to the pressure received from the isolation valve on a line 18b, the switch is in an open state. However, when the pressure supplied by the combination valve on the line 18b is greater than the pressure supplied to the rear brake, indicating that the system has entered the anti-lock mode, the switch closes.

Basically, the components of the switch are positioned within the aperture 66c formed in the core member 66 which intersects and extends transversely to the axial passageway. The individual components of the pressure differential switch 44 are shown in more detail in the exploded perspective view of FIG. 7. More specifically, the pressure differential switch 44 includes a differential valve 130, a biasing helical spring 132, and O-rings 134a 134b and 134c which function to sealingly surround selected portions of the valve 130 and to sealingly engage selected outer annular surfaces of the cavity 66c in which the valve 130 is positioned. Also, the switch 44 includes an externally threaded plug 136 which, as shown in FIG. 10, is threaded into the upper end of the aperture 66c and is sealingly connected thereto by means of an O-ring 136a. Normally, the helical spring 132 which, as shown in FIG. 10, has one end which engages the lower end of the plug 136 and a lower end which engages a shoulder 130a formed on the valve 130, urges the valve downwardly to maintain the contact tip 130b of the valve in spaced apart, unconnected relationship with a contact terminal 138 located in the upper end of the plug and surrounded by an insulating member 140. An intermediate portion of the valve is exposed to the rear brake pressure via the passageway 66a, while a lower shoulder 130c of the valve 130 is exposed to the pressure received from the combination valve via a passageway 66j which is in communication with the fluid surrounding the isolation valve armature 70.

When the isolation valve is closed, and the upward force exerted in the valve 130 by the fluid pressure on the shoulder 130c is greater than the resultant downward force of the helical spring 132 and the pressure exerted on the valve via the fluid in the passageway 66a, the valve will be urged upwardly (as viewed in FIG. 10) such that the upper tip 130b of the valve contacts the terminal 138, causing a ground potential signal to be generated in the associated electrical line 46. When the pressure in the passageway 66j has fallen such that the resultant upward force on the differential valve is less than the resultant downward force caused by the helical spring and the rear brake pressure in the passageway 66a, the differential valve will move downwardly, thereby opening the differential switch 44.

In accordance with the provisions of the Patent Statutes, the principle and mode of operation of the invention have been illustrated and described in what is considered to represent its preferred embodiment. However, it should be noted that the invention may be practiced otherwise than as specifically illustrated and described without departing from the spirit of the following claims.

What is claimed is:

1. A control valve for use in a vehicle anti-lock braking system adapted to control the application of pressurized brake fluid to at least one selected vehicle brake, said valve comprising:

an outer housing having an inlet coupled to receive pressurized brake fluid and an outlet coupled to supply pressurized brake fluid to the selected vehicle brake, said housing having a passageway formed therein for connecting said inlet to said outlet;

normally open isolation valve means located in said passageway for controlling the flow of fluid through said passageway between said inlet and said outlet, said valve means movable between a normally open position wherein fluid can flow from said inlet to said outlet and a closed position wherein fluid is prevented from flowing from said inlet to said outlet;

means for exerting a biasing force to urge said valve means toward said normally open position;

solenoid means responsive to a control signal for moving said valve means from said open position to said closed position;

said valve means and said housing means cooperating to define a chamber for containing brake fluid, said chamber varying in volume as said valve means is moved from said closed position to said open position; and hydraulic damping means associated with said valve means for restricting fluid flow between said passageway and said chamber for damping the movement of said valve means as said valve means is moved from said closed position to said open position whereby the opening of said valve means is precisely controlled.

2. The control valve according to claim 1 wherein said damping means including means for permitting a predetermined fluid flow between said passageway and said chamber when said valve means is moved from said open position to said closed position and for partially restricting fluid flow between said passageway and said chamber to less than said predetermined flow when said valve means is moved from said closed position to said open position whereby the opening movement of said valve means is damped.

3. The control valve according to claim 2 wherein said passageway is a first passageway and said means for permitting fluid flow between said first passageway and said chamber includes second and third passageways, said damping means including means for permitting fluid flow through said second and third passageways when said valve means is moved from said open position to said closed position and for substantially restricting fluid flow through said second passageway and permitting fluid flow through said third passageway when said valve means is moved from said closed position to said open position.

4. The control valve according to claim 2 wherein said chamber decreases in volume as said valve means is moved from said closed position to said open position.

5. The control valve according to claim 1 wherein said passageway is a first passageway and further including a second passageway formed in said housing for connecting said outlet to a fluid accumulator, a normally closed dump valve means located in said second passageway for controlling the flow of fluid between said outlet and said accumulator, said dump valve means moveable between a normally closed position and an open position for permitting fluid flow from said outlet to said accumulator through said second passageway.

6. The control valve according to claim 5 wherein said fluid accumulator includes means for maintaining the fluid stored therein at a predetermined increased pressure relative to a non-actuated fluid pressure supplied to the selected vehicle brake.

7. The control valve according to claim 6 including means for preventing fluid flow from said outlet to said accumulator when said dump valve is closed and the fluid pressure at said outlet is greater than said predetermined pressure in said accumulator, and means for permitting fluid flow from said accumulator to said outlet when said dump valve is closed and the fluid pressure in said accumulator is greater than the pressure at said outlet.

8. The control valve according to claim 1 including a pressure differential switch located in said housing and connected between said inlet and said outlet for monitoring the pressure differential across said isolation valve means.

9. The control valve according to claim 8 wherein said pressure differential switch generates a signal when the fluid pressure at said inlet is greater than the fluid pressure at said outlet.

10. A brake control system for a wheeled vehicle having first and second sets of wheels provided with first and second sets of wheel brakes, a brake pedal operable by the vehicle operator, a master cylinder connected with and actuated by the brake pedal to supply pressurized brake fluid in a first brake pressurizing circuit to actuate the first set of wheel brakes and to supply pressurized brake fluid in a second brake pressurizing circuit to actuate the second set of wheel brakes, said second brake pressurizing circuit including a control valve for controlling the application of fluid to the second set of wheel brakes and a control means for operating said control valve, said control valve comprising:

an outer housing having an inlet coupled to receive pressurized brake fluid from the master cylinder and an outlet coupled to supply pressurized brake fluid to the second set of wheel brakes, said housing having a passageway formed therein for connecting said inlet to said outlet;

normally open isolation valve means located in said passageway for controlling the flow of fluid through said passageway between said inlet and said outlet, said valve means movable between an open position wherein fluid can flow from said inlet to said outlet and a closed position wherein fluid is prevented from flowing from said inlet to said outlet;

means for exerting a biasing force to urge said valve means toward said normally open position;

solenoid means responsive to a first control signal from the control means for closing said isolation valve means to hold the fluid pressure to the second set of brakes at a relatively constant level;

said solenoid means responsive to a second control signal from the control means for momentarily opening said isolation valve means for a predetermined time period after said valve means has been closed to selectively reapply pressure from the master cylinder to the second set of wheel brakes;

said valve means and said housing means cooperating to define a chamber for containing brake fluid, said chamber adapted to vary in volume as said valve means is moved from said closed position to said open position; and hydraulic damping means associated with said valve means for restricing fluid flow between said passageway and said chamber for damping the movement of said valve means as said valve means is moved from said closed position to said open position whereby the opening of said valve means and the selective reapplication of master cylinder pressure to the second set of wheel brakes is precisely controlled.

11. The control valve according to claim 10 wherein said damping means including means for permitting a predetermined fluid flow between said passageway and said chamber when said valve means is moved from said open position to said closed position and for partially restricting fluid flow between said passageway and said chamber to less than said predetermined flow when said valve means is moved from said closed position to said open position whereby the opening movement of said valve means is damped.

12. The control valve according to claim 11 wherein said passageway is a first passageway and said means for permitting fluid flow between said first passageway and said chamber includes second and third passageways, said damping means including means for permitting fluid flow through said second and third passageways when said valve means is moved from said open position to said closed position and for substantially restricting fluid flow through said second passageway and permitting fluid flow through said third passageway when said valve means is moved from said closed position to said open position.

13. The control valve according to claim 12 wherein said chamber decreases in volume as said valve means is moved from said closed position to said open position.

14. The control valve according to claim 10 wherein said passageway is a first passageway and further including a second passageway formed in said housing for connecting said outlet to a fluid accumulator, a normally closed dump valve means located in said second passageway for controlling the flow of fluid between said outlet and said accumulator, said dump valve means moveable between a normally closed position and an open position for permitting fluid flow from said outlet to said accumulator through said second passageway.

15. The control valve according to claim 14 wherein said fluid accumulator includes means for maintaining the fluid stored therein at a predetermined increased pressure relative to a non-actuated fluid pressure supplied to the second set of wheel brakes.

16. The control valve according to claim 15 including means for preventing fluid flow from said outlet to said accumulator when said dump valve is closed and the fluid pressure at said outlet is greater than said predetermined pressure in said accumulator, and means for permitting fluid flow from said accumulator to said outlet when said dump valve is closed and the fluid pressure in said accumulator is greater than the pressure at said outlet.

17. A control valve for use in a vehicle anti-lock braking system adapted to control the application of pressurized brake fluid to at least one selected vehicle brake, said valve comprising:

an outer housing having an inlet coupled to receive pressurized brake fluid and an outlet coupled to supply pressurized brake fluid to the selected vehicle brake, said housing having a passageway formed therein for connecting said inlet to said outlet;

normally open isolation valve means located in said passageway for controlling the flow of fluid through said passageway between said inlet and said outlet, said valve means movable between a normally open position wherein fluid can flow from said inlet to said outlet and a closed position wherein fluid is prevented from flowing from said inlet to said outlet;

means for exerting a biasing force to urge said valve means toward said open position;

solenoid means responsive to a control signal for moving said valve means from said open position to said closed position; and damping means associated with said valve means for damping the movement of said valve means as said valve means is moved from said closed position to said open position, said damping means providing a hydraulic damping force in a direction opposite said biasing force whereby the opening of said valve means is precisely controlled.

18. The control valve according to claim 17 wherein said damping means is operable to maintain a relatively constant hydraulic damping force as said valve means is moved from said closed position to said open position.

19. A brake control system for a wheeled vehicle having first and second sets of wheels provided with first and second sets of wheel brakes, a brake pedal operable by the vehicle operator, a master cylinder connected with and actuated by the brake pedal to supply pressurized brake fluid in a first brake pressurizing circuit to actuate the first set of wheel brakes and to supply pressurized brake fluid in a second brake pressurizing circuit to actuate the second set of wheel brakes, said second brake pressurizing circuit including a control valve for controlling the application of fluid to the second set of wheel brakes and a control means for operating said control valve, said control valve comprising:

an outer housing having an inlet coupled to receive pressurized brake fluid from the master cylinder and an outlet coupled to supply pressurized brake fluid to the second set of wheel brakes, said housing having a passageway formed therein for connecting said inlet to said outlet;

normally open isolation valve means located in said passageway for controlling the flow of fluid through said passageway between said inlet and said outlet, said valve means movable between an open position wherein fluid can flow from said inlet to said outlet and a closed position wherein fluid is prevented from flowing from said inlet to said outlet;

means for exerting a biasing force to urge said valve means toward said open position;

solenoid means responsive to a control signal from the control means for closing said isolation valve means to hold the fluid pressure to the second set of brakes at a relatively constant level;

said solenoid means responsive to a second control signal from the control means for momentarily opening said isolation valve means for a predetermined time period after said valve means has been closed to selectively reapply pressure from the master cylinder to the second set of wheel brakes; and damping means associated with said valve means for damping the movement of said valve means as said valve means is moved from said closed position to said open position, said damping means providing a hydraulic damping force in a direction opposite said biasing force whereby the opening of said valve means is precisely controlled.

20. The control valve according to claim 19 wherein said passageway is a first passageway and further including:

a fluid accumulator located within said housing and connected to said outlet by a second passageway; and a normally closed dump valve means operable independently from said isolation valve means located in said second passageway for controlling the flow of fluid between said outlet and said accumulator, said dump valve means moveable between a normally closed position and an open position for permitting fluid flow from said outlet to said accumulator through said second passageway.

21. The control valve according to claim 19 wherein said damping means is operable to maintain a relatively constant hydraulic damping force as said valve means is moved from said closed position to said open position.

* * * * *